United States Patent
Johansson et al.

(10) Patent No.: US 12,041,490 B2
(45) Date of Patent: Jul. 16, 2024

(54) NOTIFYING A MANAGEMENT SYSTEM OF QUALITY OF EXPERIENCE MEASUREMENT REPORTING STATUS

(71) Applicant: Telefonaktiebolaget LM Ericsson (publ), Stockholm (SE)

(72) Inventors: Nicklas Johansson, Linköping (SE); Robert Petersen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 616 days.

(21) Appl. No.: 17/284,925

(22) PCT Filed: Oct. 24, 2019

(86) PCT No.: PCT/IB2019/059135
§ 371 (c)(1),
(2) Date: Apr. 13, 2021

(87) PCT Pub. No.: WO2020/128657
PCT Pub. Date: Jun. 25, 2020

(65) Prior Publication Data
US 2021/0385691 A1 Dec. 9, 2021

(51) Int. Cl.
*H04W 28/24* (2009.01)
*H04W 24/10* (2009.01)
*H04W 28/02* (2009.01)

(52) U.S. Cl.
CPC ........... *H04W 28/24* (2013.01); *H04W 24/10* (2013.01); *H04W 28/0284* (2013.01)

(58) Field of Classification Search
CPC . H04W 28/24; H04W 24/10; H04W 28/0284; H04W 48/06; H04W 24/00
See application file for complete search history.

(56) References Cited

U.S. PATENT DOCUMENTS

| | | | |
|---|---|---|---|
| 2013/0064120 A1* | 3/2013 | Bodog | H04W 24/10 370/252 |
| 2013/0114446 A1* | 5/2013 | Liu | H04W 24/10 370/252 |
| 2013/0170362 A1* | 7/2013 | Futaki | H04W 24/10 370/241.1 |

(Continued)

FOREIGN PATENT DOCUMENTS

| CN | 102231894 B | * 12/2013 |
|---|---|---|
| WO | 2011120585 A1 | 10/2011 |

(Continued)

OTHER PUBLICATIONS

Li et al., "Network Switching Method and Device", Mar. 8, 2018, WO, English translation of WO 2018041097 (Year: 2018).*

(Continued)

*Primary Examiner* — Michael K Phillips
(74) *Attorney, Agent, or Firm* — COATS & BENNETT, PLLC

(57) ABSTRACT

A radio access network (RAN) node (110) in a RAN (130) of a wireless communication network (180) signals a wireless device (100) to stop reporting Quality of Experience (QoE) measurements to the RAN (130), and notifies a management system (120) in a core network (140) of the wireless communication network (180) that the reporting of QoE measurements to the RAN (130) has stopped.

20 Claims, 15 Drawing Sheets

(56) References Cited

U.S. PATENT DOCUMENTS

| | | | | |
|---|---|---|---|---|
| 2013/0329593 | A1* | 12/2013 | Kim | H04W 24/10 370/252 |
| 2013/0331077 | A1* | 12/2013 | Mucke | H04W 76/34 455/418 |
| 2014/0064132 | A1* | 3/2014 | Liu | H04W 24/10 370/252 |
| 2014/0082697 | A1* | 3/2014 | Watfa | H04L 63/0485 726/3 |
| 2014/0086094 | A1* | 3/2014 | Keskitalo | H04W 24/08 370/252 |
| 2014/0155056 | A1* | 6/2014 | Jactat | H04W 16/18 455/422.1 |
| 2014/0187247 | A1* | 7/2014 | Sarkar | H04W 36/0083 455/437 |
| 2015/0031369 | A1* | 1/2015 | Gunnarsson | H04W 36/04 455/438 |
| 2017/0019750 | A1* | 1/2017 | Palanisamy | H04W 28/0289 |
| 2017/0374579 | A1* | 12/2017 | Wang | H04W 28/0278 |
| 2018/0198867 | A1* | 7/2018 | Dao | H04W 76/30 |
| 2018/0352495 | A1* | 12/2018 | Yanagisako | H04W 36/32 |
| 2021/0195675 | A1* | 6/2021 | Park | H04W 76/27 |

FOREIGN PATENT DOCUMENTS

| | | | | |
|---|---|---|---|---|
| WO | 2013014119 | A1 | 1/2013 | |
| WO | WO-2018041097 | A1 * | 3/2018 | H04W 36/0083 |
| WO | 2018150248 | A1 | 8/2018 | |

OTHER PUBLICATIONS

Fu et al., "Method and device for transmitting parameters required for QoS (quality of service) verification", Dec. 25, 2013, CN, English translation of CN-102231894. (Year: 2013).*

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.3.0, Sep. 1, 2018, pp. 1-918, 3GPP, France.

Ericsson, "Attributes for QoE measurement collection", 3GPP TSG SA WG5 (Telecom Management) Meeting #116, Reno, USA, Nov. 27, 2017, pp. 1-7, S5-176274 (revision of S5-176yyy), 3GPP.

3rd Generation Partnership Project, "3rd Generation Partnership Project; Technical Specification Group Core Network and Terminals; AT command set for User Equipment (UE) (Release 15)", Technical Specification, 3GPP TS 27.007 V15.3.0, Sep. 1, 2018, pp. 1-381, 3GPP, France.

NTT Docomo, Inc., "Inter PLMN checking for Immediate MDT", 3GPP TSG-RAN2#73bis, Shanghai, China, Apr. 5, 2011, pp. 1-6, R2-112214, 3GPP.

Nokia, et al., "Consideration on QMC for steaming in UTRAN", 3GPP TSG-RAN WG2 Meeting #96, Reno, USA, Nov. 4, 2016, pp. 1-4, R2-168138, 3GPP.

* cited by examiner

NOTIFYING A MANAGEMENT SYSTEM OF QUALITY OF EXPERIENCE MEASUREMENT REPORTING STATUS

RELATED APPLICATIONS

This application claims priority to U.S. Application No. 62/754,117, filed 1 Nov. 2018, disclosure of which is incorporated in its entirety by reference herein.

TECHNICAL FIELD

The present disclosure generally relates to the technical field of wireless communication networks, and more particularly relates to Quality of Experience Measurement collection and/or reporting in such networks.

BACKGROUND

"Quality of Experience (QoE) Measurement Collection" is a technique introduced into Third Generation Partnership Project (3GPP) release 15 for use in Long Term Evolution (LTE) and potentially for use in future wireless communication standards (e.g., New Radio (NR)). QoE Measurement Collection includes features intended to be applied to streaming services and Multimedia Telephony Service for Internet Protocol (IP) Multimedia Subsystem (IMS) (MTSI) services.

Traditionally, QoE Measurement Collection involves a wireless device (e.g., a User Equipment (UE)) performing measurements to collect information about the quality of streaming services used in the UE. The streaming service is typically a third-party streaming application on top of a Packet Switched (PS) Interactive Radio Access Bearer (RAB) defined in the Radio Access Network (RAN). The general purpose of these measurements is to collect information that may be used to enable improvements to the quality of the streaming service. Thus, it would be advantageous to ensure that network conditions do not interfere with the ability to collect or exploit this information for purposes of improving service.

SUMMARY

Embodiments of the present disclosure enhance QoE measurement collection and/or reporting. In some embodiments, this is accomplished by particular signaling between a RAN node and a management system and/or UE, as discussed below. According to some particular embodiments, the management system is informed when QoE measurement reporting has stopped and/or started. This input to the management system may be used to determine whether or not to take actions to modify an initial QoE measurement collection configuration. For example, the management system may trigger additional QoE measurements through, e.g., increasing the targeted number of cells or the duration of the QoE measurement collection.

Embodiments of the present disclosure include a method implemented by a RAN node in a RAN of a wireless communication network. The method comprises signaling a wireless device to stop reporting Quality of Experience (QoE) measurements to the RAN, and notifying a management system in a core network of the wireless communication network that the reporting of QoE measurements to the RAN has stopped.

In some embodiments, the method further comprises, subsequent to notifying the management system that the reporting of QoE measurements to the RAN has stopped, signaling the wireless device to restart reporting of the QoE measurements, and notifying the management system that the reporting of QoE measurements has restarted. In some such embodiments, signaling the wireless device to stop reporting is responsive to detecting an overload condition of the RAN. In some such embodiments, signaling the wireless device to restart reporting is responsive to detecting that the overload condition of the RAN has ended. In some such embodiments, the method further comprises receiving, from the management system, a message canceling QoE measurements from the wireless device. In other such embodiments, the method further comprises signaling the wireless device to modify how the wireless device performs the QoE measurements.

According to some embodiments that include signaling the wireless device to modify how the wireless device performs the QoE measurements, signaling the wireless device to modify how the wireless device performs the QoE measurements is responsive to receiving a request from the management system to modify how the wireless device performs the QoE measurements. In some such embodiments, the request from the management system to modify how the wireless device performs the QoE measurements comprises at least one QoE measurement parameter for the wireless device to use for collecting subsequent QoE measurements. In some such embodiments, signaling the wireless device to modify how the wireless device performs the QoE measurements is further responsive to determining that the wireless device is relevant to the at least one QoE measurement parameter received in the request from the management system.

According to some embodiments that include signaling the wireless device to modify how the wireless device performs the QoE measurements, signaling the wireless device to modify how the wireless device performs the QoE measurements may additionally or alternatively comprise signaling the wireless device to prolong a collection duration of the QoE measurements.

According to some embodiments that include signaling the wireless device to modify how the wireless device performs the QoE measurements, signaling the wireless device to modify how the wireless device performs the QoE measurements may comprise signaling the wireless device to increase a target area of the QoE measurements. In some such embodiments, signaling the wireless device to increase the target area is in response to receiving a target area increase request from the management system.

In some embodiments, notifying the management system that the reporting of QoE measurements has stopped comprises notifying the management system of a service type of the QoE measurements for which reporting has stopped.

In some embodiments, notifying the management system that the reporting of the QoE measurements to the RAN comprises notifying the management system via an Access and Mobility Management Function (AMF), a Serving General Packet Radio Services (GPRS) Support Node (SGSN), and/or a Mobility Management Entity (MME).

In some embodiments, the method further comprises forwarding the reporting of the QoE measurements from the wireless device to a measurement collection entity in the core network.

Other embodiments include a RAN node of a wireless communication network configured to perform any of the methods described above.

In some embodiments, the RAN node comprises a processor and a memory, the memory containing instructions executable by the processor whereby the device is operative to perform any of the methods described above.

In some embodiments, the RAN node comprises a signaling module configured to signal a wireless device to stop reporting Quality of Experience (QoE) measurements to the RAN, and a notifying module configured to notify a management network in a core network of the wireless communication network that the reporting of QoE measurements to the RAN has stopped.

Other embodiments include a method implemented by a management system in a core network (CN) of a wireless communication network. The method comprises receiving a notification, from a RAN node in a RAN of the wireless communication network, indicating that reporting of Quality of Experience (QoE) measurements from a wireless device to the RAN has stopped or restarted.

In some embodiments, the method further comprises sending a message to the RAN node canceling QoE measurements from the wireless device.

In some other embodiments, the method further comprises, responsive to receiving the further notification, sending a request to the RAN node requesting a modification to how the wireless device performs the QoE measurements. In some such embodiments, the request requesting the modification to how the wireless device performs the QoE measurements comprises at least one QoE measurement parameter for the wireless to use for collecting subsequent QoE measurements. In some embodiments, sending the request requesting the modification to how the wireless device performs the QoE measurements is additionally or alternatively responsive to determining that the reporting of QoE measurements from the wireless device was stopped for longer than a threshold duration. In some embodiments, the requesting the modification to how the wireless device performs the QoE measurements comprises requesting that the wireless device prolong a collection duration of the QoE measurements. In some embodiments, the requesting the modification to how the wireless device performs the QoE measurements comprises requesting that the RAN node increase a target area of the QoE measurements. In some embodiments, the requesting the modification to how the wireless device performs the QoE measurements additionally or alternatively comprises requesting that the wireless device increase a target area of the QoE measurements.

In some embodiments, receiving the notification comprises receiving the notification via an AMF, SGSN, and/or an MME.

In some embodiments, the method further comprises receiving the reporting of the QoE measurements from the wireless device via the RAN node.

In some embodiments, the notification comprises a service type of the QoE measurements.

Other embodiments include a management system in a CN of a wireless communication network configured to perform any of the methods described above with respect to the management system.

In some embodiments, the management system comprises a processor and a memory, the memory containing instructions executable by the processor whereby the management system is operative to perform any of the methods described above with respect to the management system.

In some embodiments, the management system comprises a first receiving module configured to receive a notification, from a radio access network (RAN) node in a RAN of the wireless communication network, indicating that reporting of Quality of Experience (QoE) measurements from a wireless device to the RAN has stopped or restarted.

Other embodiments include a computer program comprising instructions which, when executed on at least one processor of a node, cause the node to carry out any of the methods described above.

Other embodiments further include a carrier containing such a computer program. The carrier is one of an electronic signal, optical signal, radio signal, or computer readable storage medium.

Any of the embodiments described above may further comprise one or more features described below.

DETAILED DESCRIPTION

Figure 1:
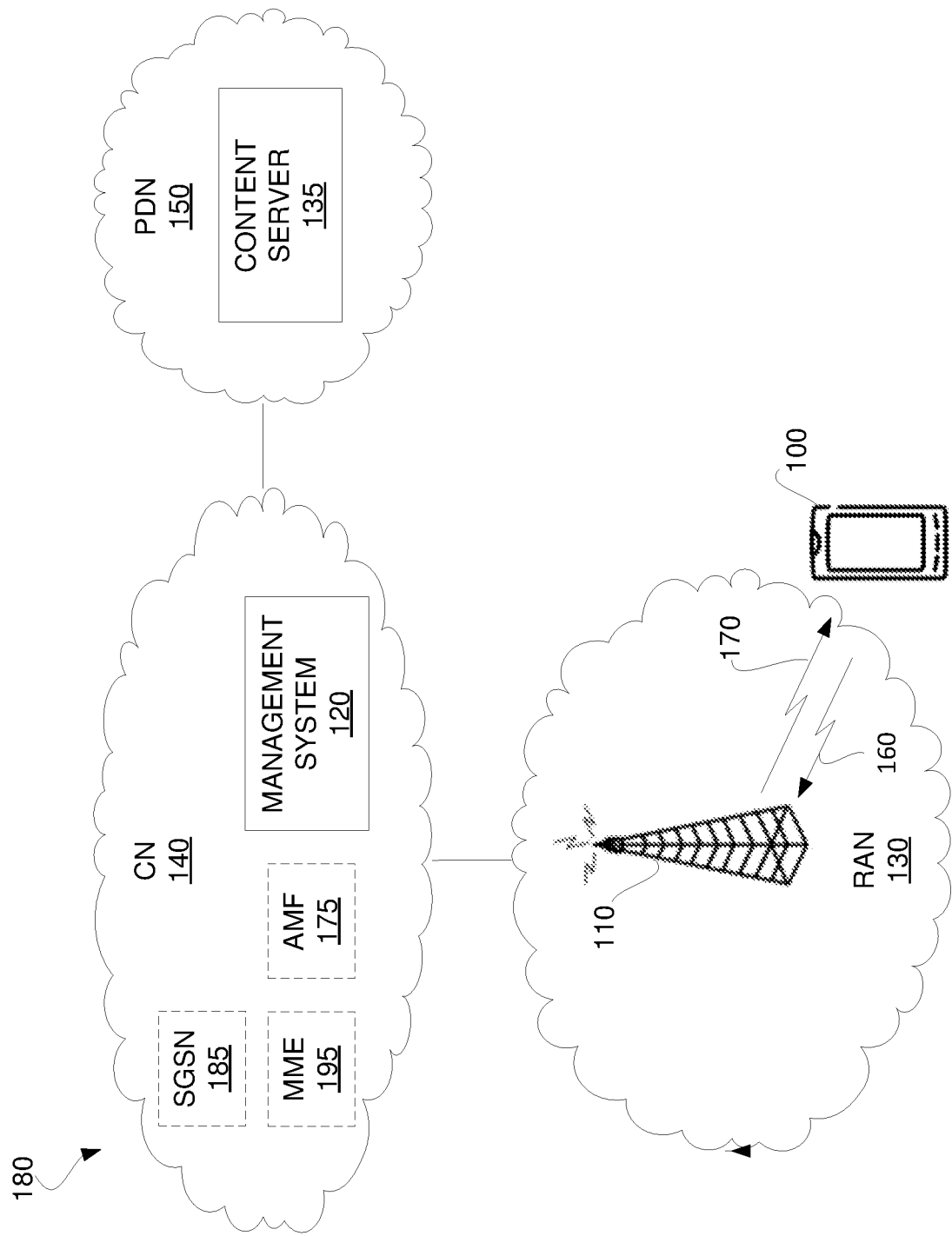
FIG. 1 is a schematic diagram illustrating an example wireless communication network, according to one or more embodiments of the present disclosure.

FIG. 1 illustrates an example wireless communication network 180 comprising a wireless device 100, a RAN 130, a Core Network (CN) 140, and a Packet Data Network (PDN) 150. The RAN 130 is responsible for radio-related functions of the wireless communication network 180. Such radio-related functions may include, for example, transmission scheduling, radio resource management, and/or coding, among other things. The CN 140 is responsible for non-radio-related functions of the wireless communication network 180. Such non-radio-related functions may include, for example, authentication and/or charging, among other things.

The RAN 130 comprises a RAN node 110. The wireless device 100 and RAN node 110 are configured to exchange signals with each other over a wireless interface. In particular, the RAN node 110 is configured to receive signals transmitted from the wireless device 100 on an uplink 160, and transmit signals to the wireless device 100 on a downlink 170. Correspondingly, the wireless device 100 is configured to receive signals transmitted from the RAN node 110 on the downlink 170, and transmit signals to the RAN node 110 on the uplink 160. Examples of the wireless device 100 include a mobile terminal and/or user equipment (UE). Examples of the RAN node 110 include a base station and/or access node.

The CN 140 comprises a management system 120. The management system 120 configures QoE measurements taken by the wireless device 100. Examples of the management system 120 include a network manager (NM), element manager (EM), domain manager (DM), and/or Operations and Maintenance node (O&M node). In some embodiments, the management system 120 is also a Measurement Collection Entity (MCE) configured to collect measurement reports from the wireless device 100. An example of the CN 140 includes an Evolved Packet Core (EPC). In some embodiments, the CN 140 further comprises an Access and Mobility Management Function (AMF) 175, a Serving General Packet Radio Services (GPRS) Support Node (SGSN) 185 and/or a Mobility Management Entity (MME) 195.

The RAN 130 provides the wireless device 100 with access to the PDN 150 via the CN 140. The PDN 150 comprises a content server 135. The content server 135 is configured to provide data (e.g., streaming data, MTSI service data) to the wireless device 100 via the CN 140 and RAN 130. An example of the PDN 150 is the Internet, or a portion thereof. Although the content server 135 in this example is illustrated in the PDN 150, in some embodiments, the content server 135 is located elsewhere in the wireless communication network 180.

According to embodiments of the present disclosure, the management system 120 may configure or trigger the wireless device 100 to perform measurements and report those measurements towards the RAN 130. In some embodiments, this is initiated by the management system 120 in generic way for a plurality of wireless devices 100. Additionally or alternatively, this may be initiated by signaling from the management system 120 via the CN 140 and the RAN 130 that is directed to one or more particular wireless devices 100.

Figure 2:
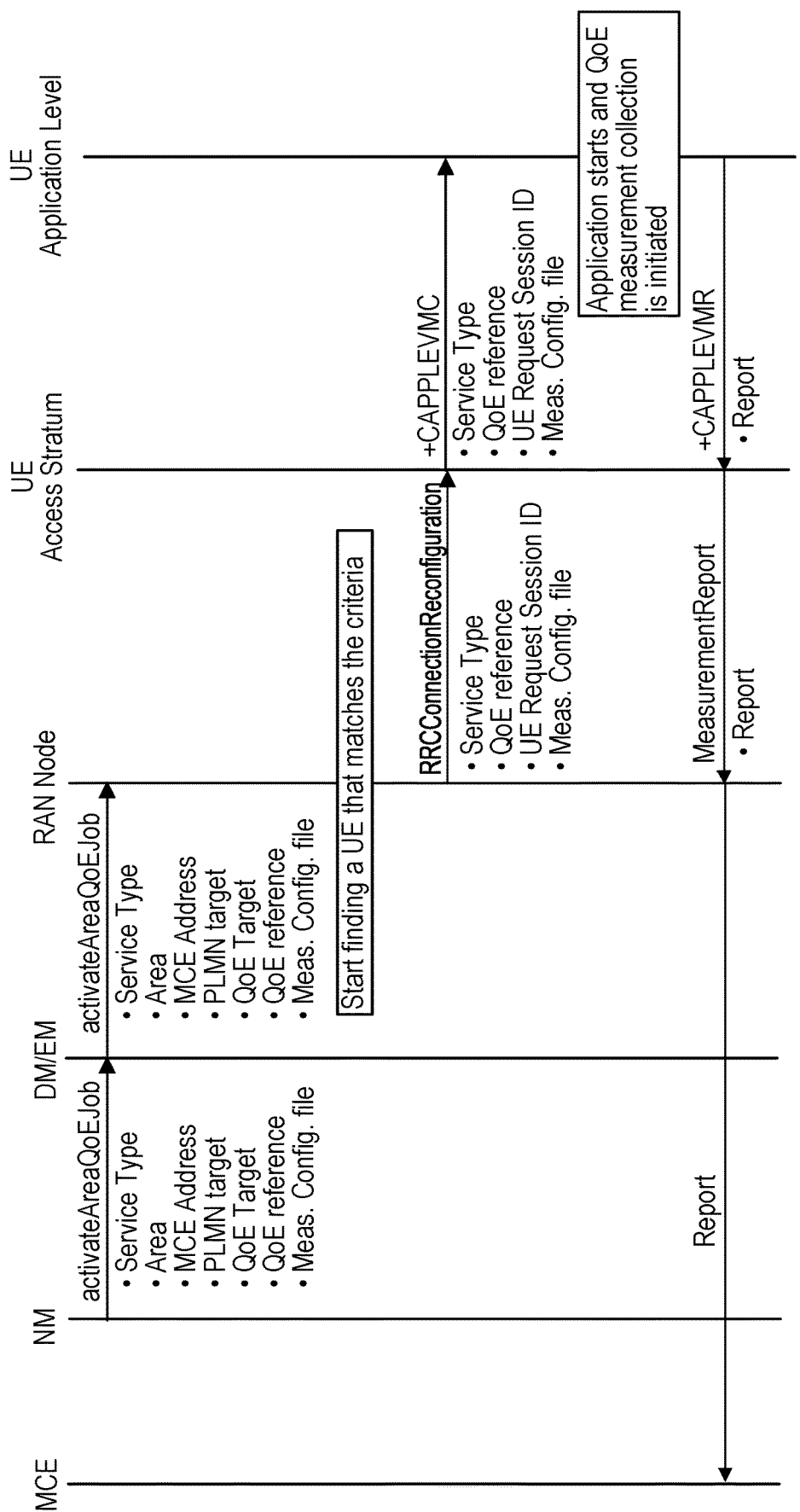
FIG. 2 is a swim lane diagram illustrating an example measurement activation and reporting process, according to one or more embodiments of the present disclosure.

FIG. 2 illustrates an example of measurement activation and reporting, performed on a management basis. According to this example, the management system 120 is an O&M node that comprises an MCE, NM, and DM/EM. Also according to this example, the wireless device 100 comprises a UE Access Stratum and a UE Application Level.

The O&M node sends an activateAreaQoEJob message to the RAN node 110 to activate QoE measurements for an area served by the RAN node 110. In the activation message, the O&M node specifies one or more parameters, e.g., service type, area, MCE address, and/or QoE target. The configuration of the measurement includes measurement details, which are encapsulated in a container that is transparent to RAN 130. Thus, in some embodiments, some parameters are inside the container (and are not visible to the RAN 130), while other parameters are outside the container, e.g., so that intermediate nodes and/or layers may make use of the parameters outside of the container.

Accordingly, FIG. 2 illustrates an example of which parameters and attributes may be included in the activateAreaQoEJob sent from the NM to the RAN node 110. Although FIG. 2 illustrates QoE measurement activation as may be appropriate for LTE, similar signaling may be applied to UTRAN, e.g., by changing the names of the messages sent from the RAN node 110 to the wireless device 100, and vice versa, as appropriate.

The trigger to perform QoE measurement collection is forwarded to the wireless device 100 using RRC signaling. The configuration to perform QoE measurements is provided to the wireless device 100 in a container, e.g., the measConfigAppLayerContainer field. The container is then forwarded to the application layer of the wireless device 100 using relevant Attention (AT) commands.

As the size of the report can be fairly large, embodiments of the present disclosure include mechanisms to stop and/or start reporting, e.g., in response to an overload situation in the RAN 130 so as not to further increase network load and/or interference. For example, in some embodiments, when the UE application layer receives an AT command with the <start-stop_reporting> Information Element set to 1, measurement reporting is stopped. In some embodiments, the measurement configuration parameters may also be deleted.

For example, in Universal Mobile Telecommunications System (UMTS) and LTE, measurement recording may be stopped and the configuration parameters deleted, whereas 5G may stop reporting without deleting the configuration parameters (i.e., the configuration parameters are retained). By retaining the configuration parameters, reporting may be readily restarted once the overload situation stops.

In some particular embodiments, if the wireless device 100 receives an otherConfig parameter that does not include a measConfigAppLayer parameter, the wireless device 100 may clear the stored application layer measurement configuration and discard any stored measurement reports. Thus, according to some embodiments, when overload occurs, no reports are sent to the management system 120 and the wireless devices 100 previously activated and configured to perform QoE measurement reporting will not do any reporting unless reactivated.

Note that while the examples herein specifically describe scenarios involving QoE measurements for streaming services and MTSI services, similar principles may be applied to other types of application layer measurements throughout this disclosure. That is, the concepts discussed herein may be valid for any type of application layer measurements. While QoE measurements for streaming services and MTSI services in particular are currently only introduced for UMTS and LTE, one or more embodiments of the present disclosure include the described concepts and solutions herein as applied to NR/5G as well.

In scenarios such as the one illustrated in FIG. 2, the management layer (NM and DM, in this example) is not aware that the RAN 130, due to overload, may have stopped one or more wireless devices 100 from sending reports, which may result in insufficient number of collected reports at the MCE. Additionally or alternatively, the management layer may also not be aware when the overload situation has stopped, and that QoE measurement reporting has been restarted. Moreover, if overload occurs over a long period, there may be inadequate reports available to the management system 120.

Accordingly, embodiments of the present disclosure introduce signaling to prolong or expand QoE measurement collection in order to ensure that sufficient number reports are received at the Measurement Collection Entity (e.g., to avoid inadequate reports being available to the management system 120). Embodiments additionally or alternatively include introduction of signaling between the RAN 130 and the management system 120 in which the RAN 130 is able to indicate that QoE measurement reporting has been stopped or started. In this way, the management system 120 will know that QoE measurement reporting has been stopped and/or started, which in turn may enable the management system 120 to determine whether or not to take actions to modify the initial QoE measurement collection. For example, in response to determining that QoE measurement reporting has been stopped and/or started, the management system 120 may trigger additional QoE measurements (e.g., by increasing the targeted number of cells to be measured, or the duration of QoE measurement collection).

Figure 3:
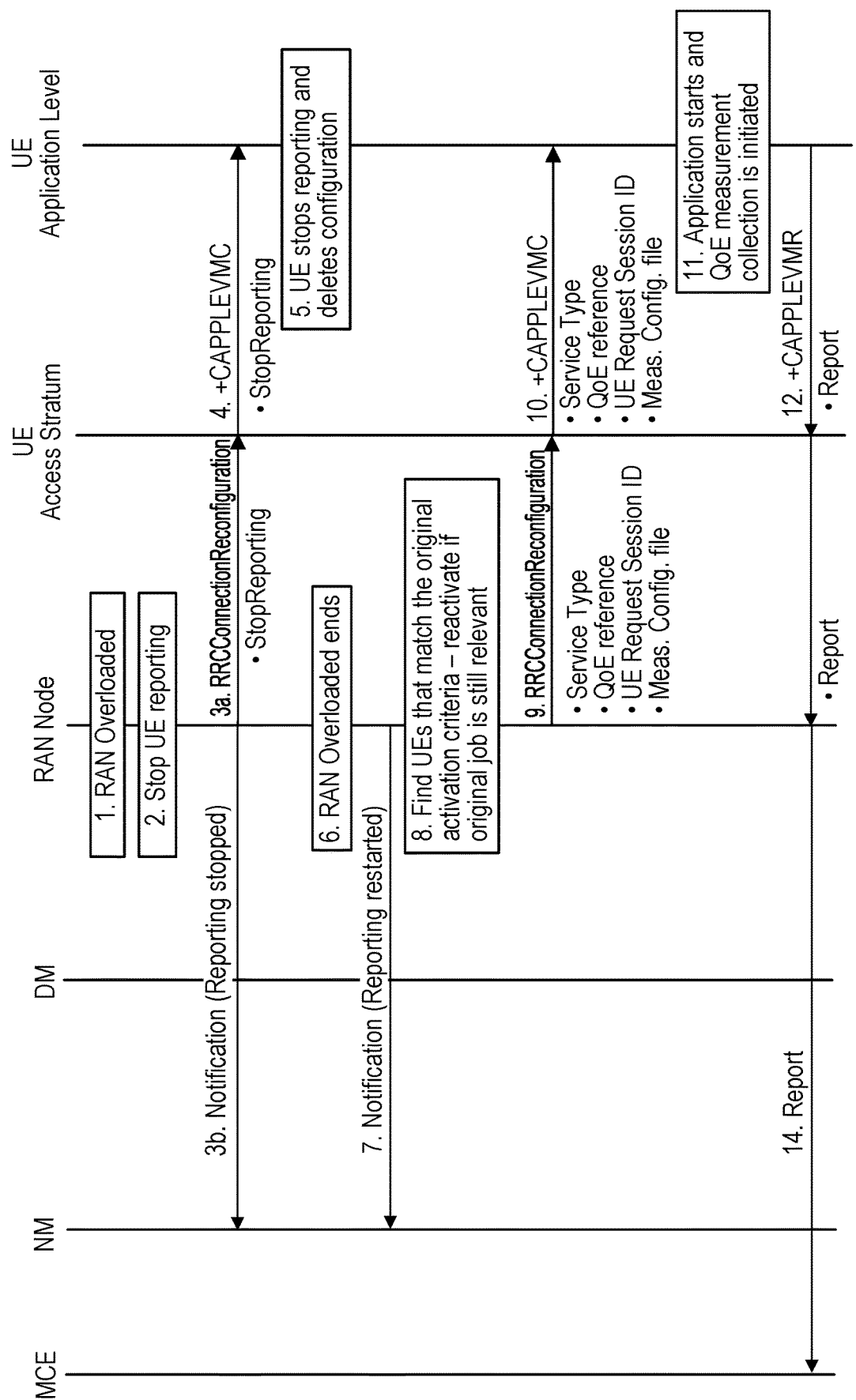
FIG. 3 is a swim lane diagram illustrating an example measurement control and notification process, according to one or more embodiments of the present disclosure.

In some embodiments, to ensure that the network management layer (e.g., the management system 120) is aware that QoE measurement reporting has been stopped and/or started in the RAN 130 due to an overload and/or return to normal conditions (respectively), the RAN 130 sends a notification to the network management layer with an indication that QoE measurement reporting has been stopped and/or started, as shown in FIG. 3. According to the example illustrated in FIG. 3, a notification is sent from the RAN 130 to the network management layer at steps 3*b* and 7, respectively. The notification may also include an indication of service type such as streaming, MTSI, or similar.

Note that the management system 120 (e.g., a Network Manager) may, after receiving the notification in step 7, modify the original job by increasing the area (e.g., the QoE target) or prolonging the duration of the QoE measurement collection. The reason for modifying the original job may, e.g., be due to the RAN overload occurring for an extended period of time. The modification of the original job may require that the NM first deactivate the current job and send a new modified activateAreaQoEJob to the RAN 130. The RAN 130 would then (as shown in step 8) look for wireless devices 100 that match the criteria specified in the new job. In some embodiments, the indication is sent to the management system 120 via a CN node, such as an AMF 175, SGSN 185 and/or MME 195.

Other embodiments include signaling other than that shown in FIG. 3 in which the RAN 130 indicates to the management system 120 that QoE measurement collection has been stopped and/or started.

In view of the above, signaling between the RAN 130 and the management system 120 enables the RAN 130 to indicate that QoE measurement reporting has been stopped and/or started, e.g., in order to enable the management server 120 to decide whether or not to modify the current QoE measurement collection job, e.g., by increasing the area or prolonging the duration of the QoE measurement collection.

Figure 4:
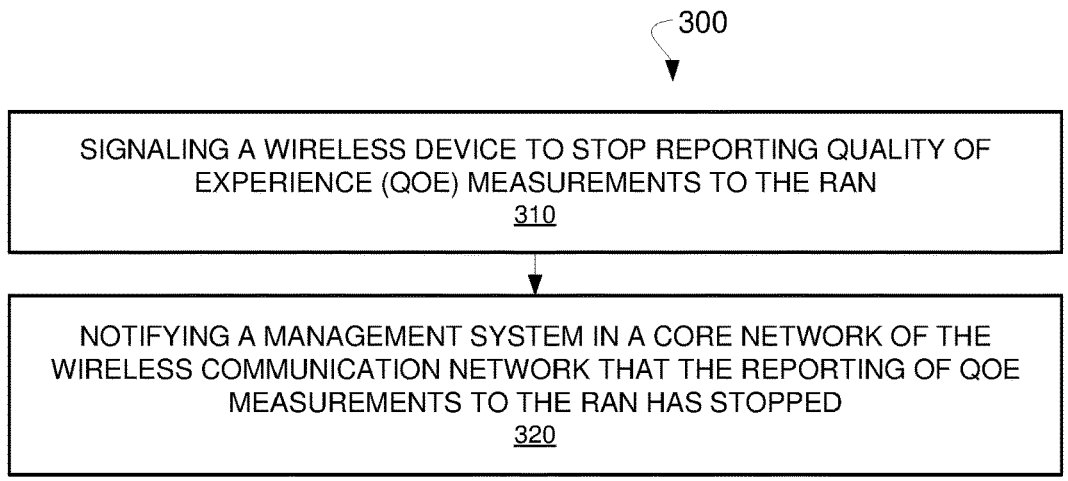
FIG. 4 is a flow diagram illustrating an example method implemented by a RAN node, according to one or more embodiments of the present disclosure.

As such, as shown in FIG. 4, embodiments of the present disclosure include a method 300 implemented by a RAN node 110 in a RAN 130 of a wireless communication system 180. The method 300 comprises signaling a wireless device 100 to stop reporting Quality of Experience (QoE) measurements to the RAN 130 (block 310). The method 300 further comprises notifying a management system 120 in a core network 140 of the wireless communication system 180 that the reporting of QoE measurements to the RAN 130 has stopped (block 320). Some embodiments additionally or alternative comprise one or more other features discussed herein.

Note that a network node as discussed herein is any type of node in the RAN 130 (e.g., a base station) or CN 140 (e.g., management system 120, AMF 175, SGSN 185, MME 195). Where the network node is a radio network node in the RAN 130, the node may be capable of communicating with another node over radio signals. A wireless device 100 is any type device capable of communicating with a RAN node 110 over radio signals. A wireless device 100 may therefore refer to a machine-to-machine (M2M) device, a machine-type communications (MTC) device, a narrowband Internet of Things (NB-IoT) device, etc. The wireless device 100 may also be a user equipment (UE), however it should be noted that the UE does not necessarily have a "user" in the sense of an individual person owning and/or operating the device. A wireless device 100 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless device 100 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device 100 as described herein may be comprised in a vehicle and may perform monitoring and/or reporting of the vehicle's operational status or other functions associated with the vehicle.

Note that the RAN node 110 described above may perform the processing herein by implementing any functional means or units. In one embodiment, for example, the RAN node 110 comprises respective circuits configured to perform the steps shown in FIG. 4. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the RAN node 110 contains instructions executable by the processing circuitry whereby the RAN node 110 is configured to carry out the processing herein.

Figure 5:
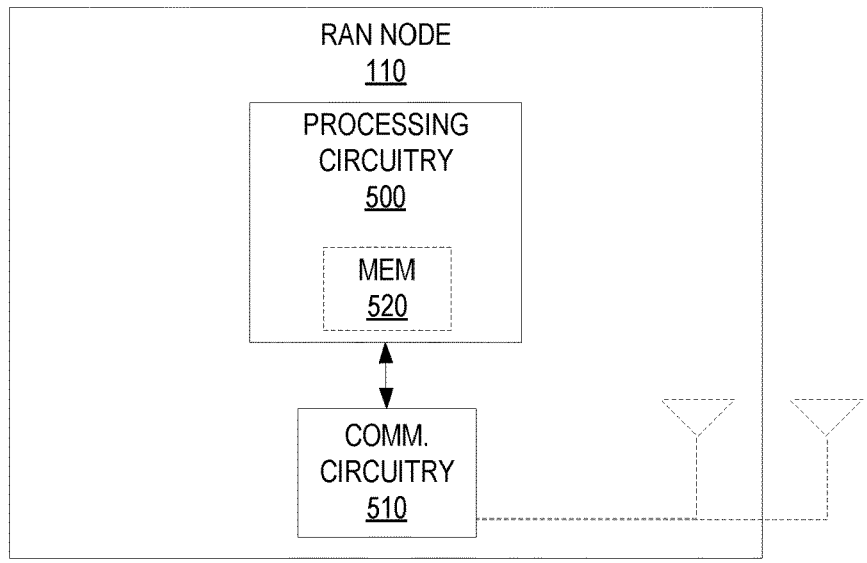
FIGS. 5 and 6 are schematic block diagrams illustrating example RAN nodes, according to one or more embodiments of the present disclosure.

FIG. 5 illustrates additional details of a RAN node 110 in accordance with one or more embodiments. As shown, the RAN node 110 comprises processing circuitry 500 and communication circuitry 510. The communication circuitry 510 is configured to communicate with one or more other nodes, e.g., the wireless device 100. In particular, the communication circuitry 510 may be configured to transmit and/or receive via one or more antennas. The processing circuitry 500 is configured to perform processing described above, e.g., in FIG. 4, such as by executing instructions stored in memory 520. The processing circuitry 500 in this regard may implement certain functional means or units.

Figure 6:
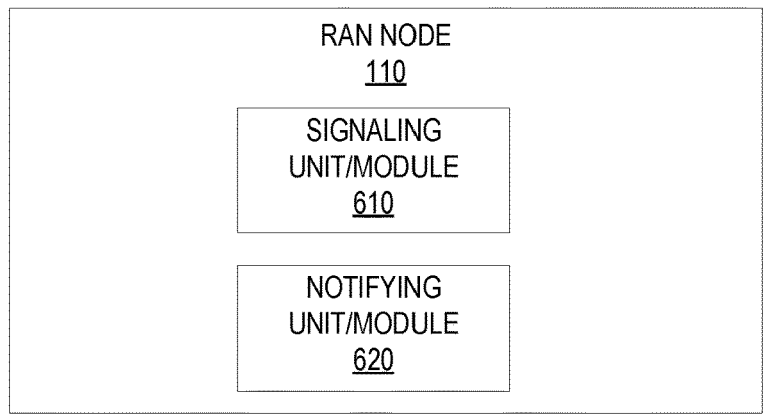

FIG. 6 in this regard illustrates a RAN node 110 in accordance with one or more other embodiments. As shown, the RAN node 110 comprises a signaling unit or module 610 configured to signal a wireless device 100 to stop reporting Quality of Experience (QoE) measurements to the RAN 130. The RAN node 110 further comprises a notifying unit or module 620 configured to notify a management system 120 in a core network 140 of the wireless communication system 180 that the reporting of QoE measurements to the RAN 130 has stopped. These modules and/or units may be implemented by the processing circuitry 500 of FIG. 5. In some embodiments, the RAN node 110 additionally or alternatively comprises one or more other units or modules configured to perform one or more other features described herein.

Other embodiments of the present disclosure include a method 400 implemented by a management system 120 in a core network 140 of a wireless communication network 180. The method 400 comprises receiving a notification, from a RAN node 110 in a RAN 130 of the wireless communication system 180, indicating that reporting of Quality of Experience (QoE) measurements from a wireless device 100 to the RAN 130 has stopped or restarted (block 410). In some embodiments, the notification indicates that the reporting of QoE measurements has stopped, and the method 400 further comprises receiving a further notification from the RAN node 110 indicating that the reporting of QoE measurements has restarted (block 420). In some embodiments, the method 400 further comprises, responsive to receiving the further notification, sending a request to the RAN node 110 requesting a modification to how the wireless device 100 performs the QoE measurements (block 430). Some embodiments additionally or alternative comprise one or more other features discussed herein.

Note that the management system 120 described above may perform the processing herein by implementing any functional means or units. In one embodiment, for example, the management system 120 comprises respective circuits configured to perform the steps shown in FIG. 7. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments, memory of the management system 120 contains instructions executable by the processing circuitry whereby the management system 120 is configured to carry out the processing herein.

Figure 7:
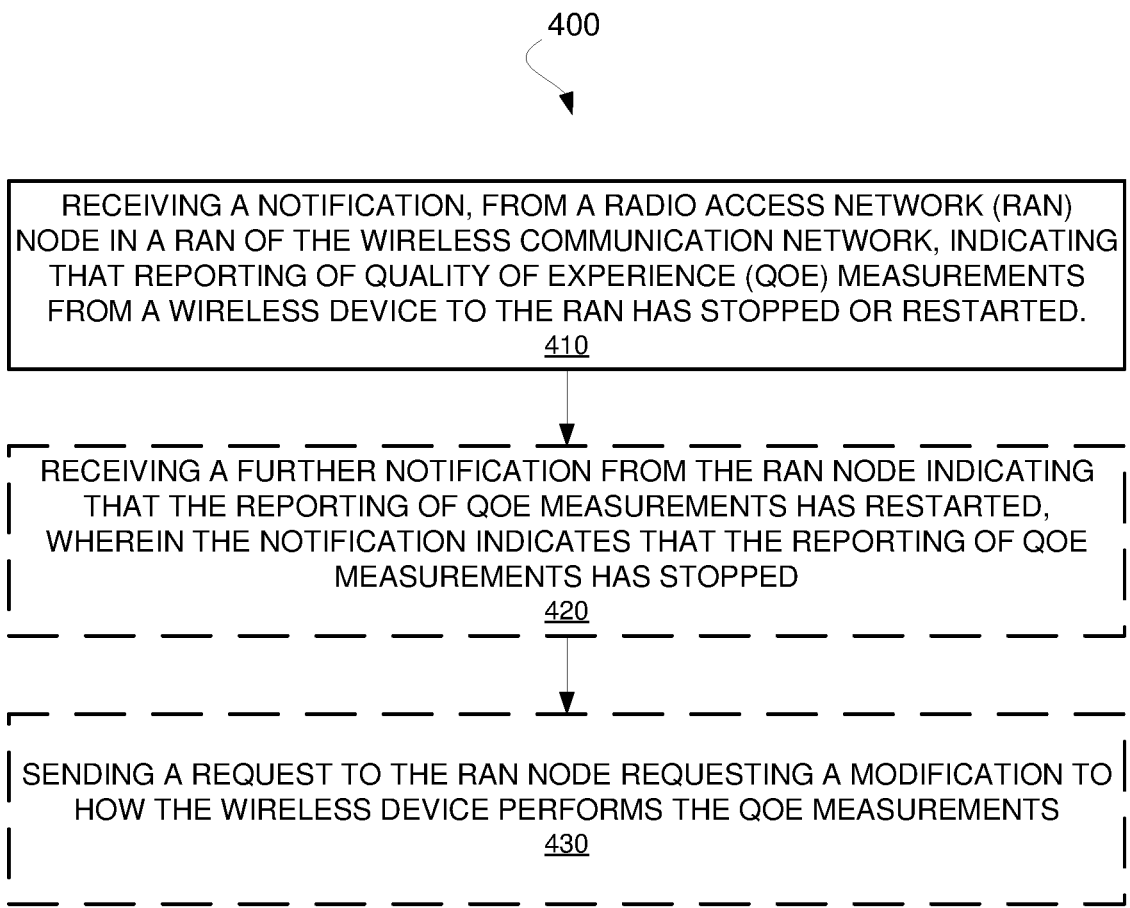
FIG. 7 is a flow diagram illustrating an example method implemented by a management system, according to one or more embodiments of the present disclosure.
Figure 8:
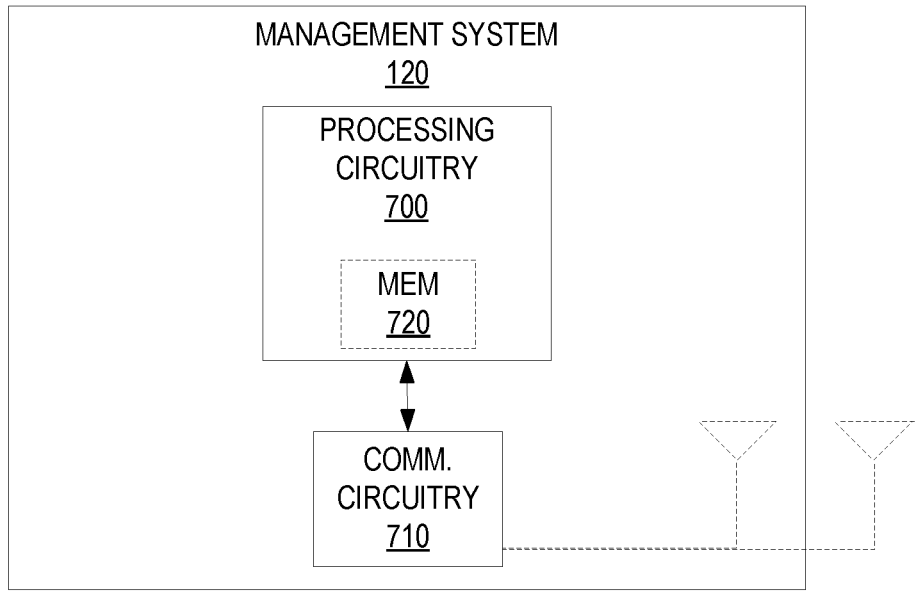
FIGS. 8 and 9 are schematic block diagrams illustrating example management systems, according to one or more embodiments of the present disclosure.

FIG. 8 illustrates additional details of a management system 120 in accordance with one or more embodiments. As shown, the management system 120 comprises processing circuitry 700 and communication circuitry 710. The communication circuitry 710 is configured to communicate with one or more other nodes, e.g., the RAN node 110. The processing circuitry 700 is configured to perform processing described above, e.g., in FIG. 7, such as by executing instructions stored in memory 720. The processing circuitry 700 in this regard may implement certain functional means or units.

Figure 9:
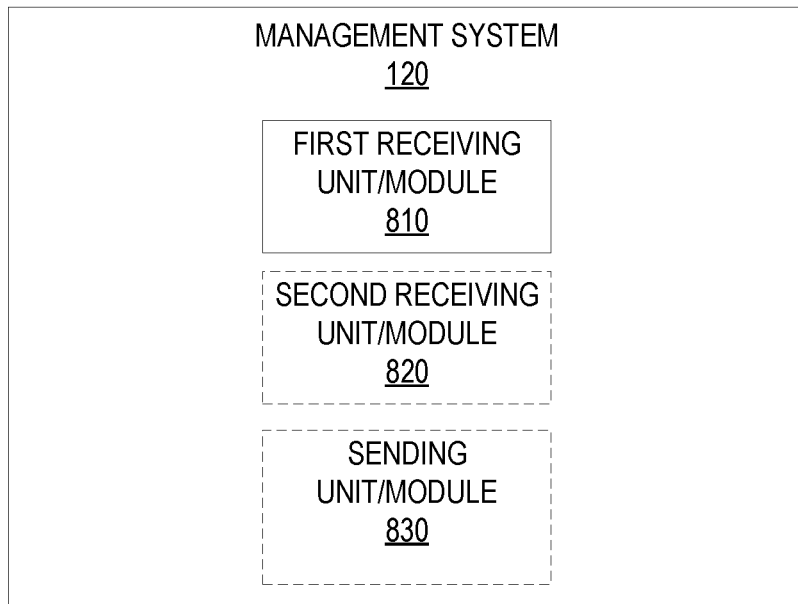

FIG. 9 in this regard illustrates a management system 120 in accordance with one or more other embodiments. As shown, the management system 120 comprises a first receiving unit or module 810 configured to receive a notification, from a RAN node 110 in a RAN 130 of the wireless communication system 180, indicating that reporting of Quality of Experience (QoE) measurements from a wireless device 100 to the RAN 130 has stopped or restarted. In some embodiments, the notification indicates that the reporting of QoE measurements has stopped, and the management system 120 further comprises a second receiving unit or module 820 configured to receive a further notification from the RAN node 110 indicating that the reporting of QoE measurements has restarted. In some embodiments, the management system 120 further comprises a sending unit or module 830 configured to send a request to the RAN node 110 requesting a modification to how the wireless device 100 performs the QoE measurements. These modules and/or units may be implemented by the processing circuitry 700 of FIG. 8. In some embodiments, the measurement system 120 additionally or alternatively comprises one or more other units or modules configured to perform one or more other features described herein.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Other embodiments will now be described with respect to certain contexts. These embodiments are combinable with and expound upon embodiments above.

Those skilled in the art will appreciate that the various methods and processes described herein may be implemented using various hardware configurations that generally, but not necessarily, include the use of one or more microprocessors, microcontrollers, digital signal processors, or the like, coupled to memory storing software instructions or data for carrying out the techniques described herein. In particular, those skilled in the art will appreciate that the circuitry of various embodiments may be configured in ways that vary in certain details from the broad descriptions given above. For instance, one or more of the processing functionalities discussed above may be implemented using dedicated hardware, rather than a microprocessor configured with program instructions. Such variations, and the engineering tradeoffs associated with each, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein.

Figure 10:
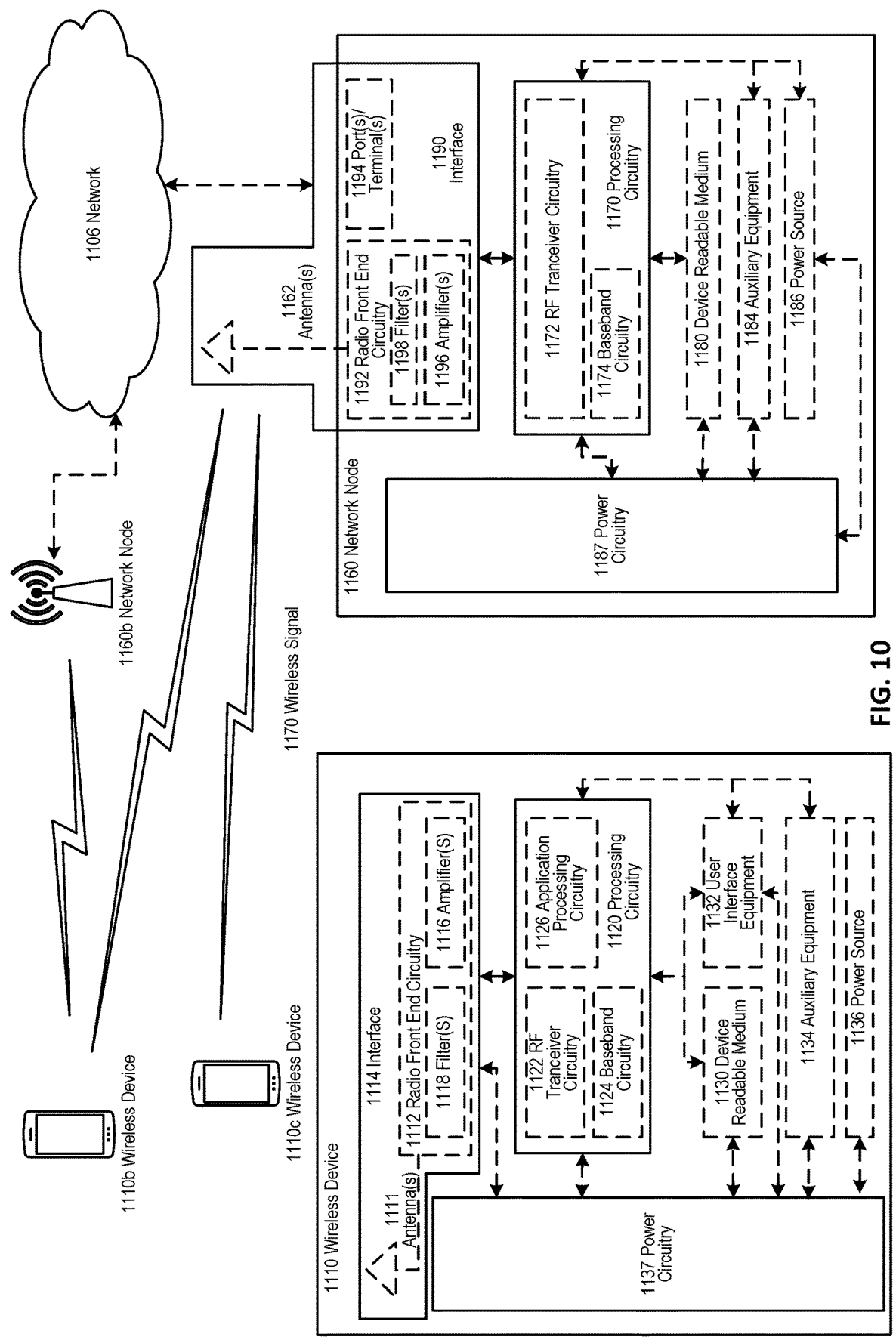
FIG. 10 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1106, network nodes 1160 and 1160*b*, and wireless devices (WDs) 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 10 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110. Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 11:
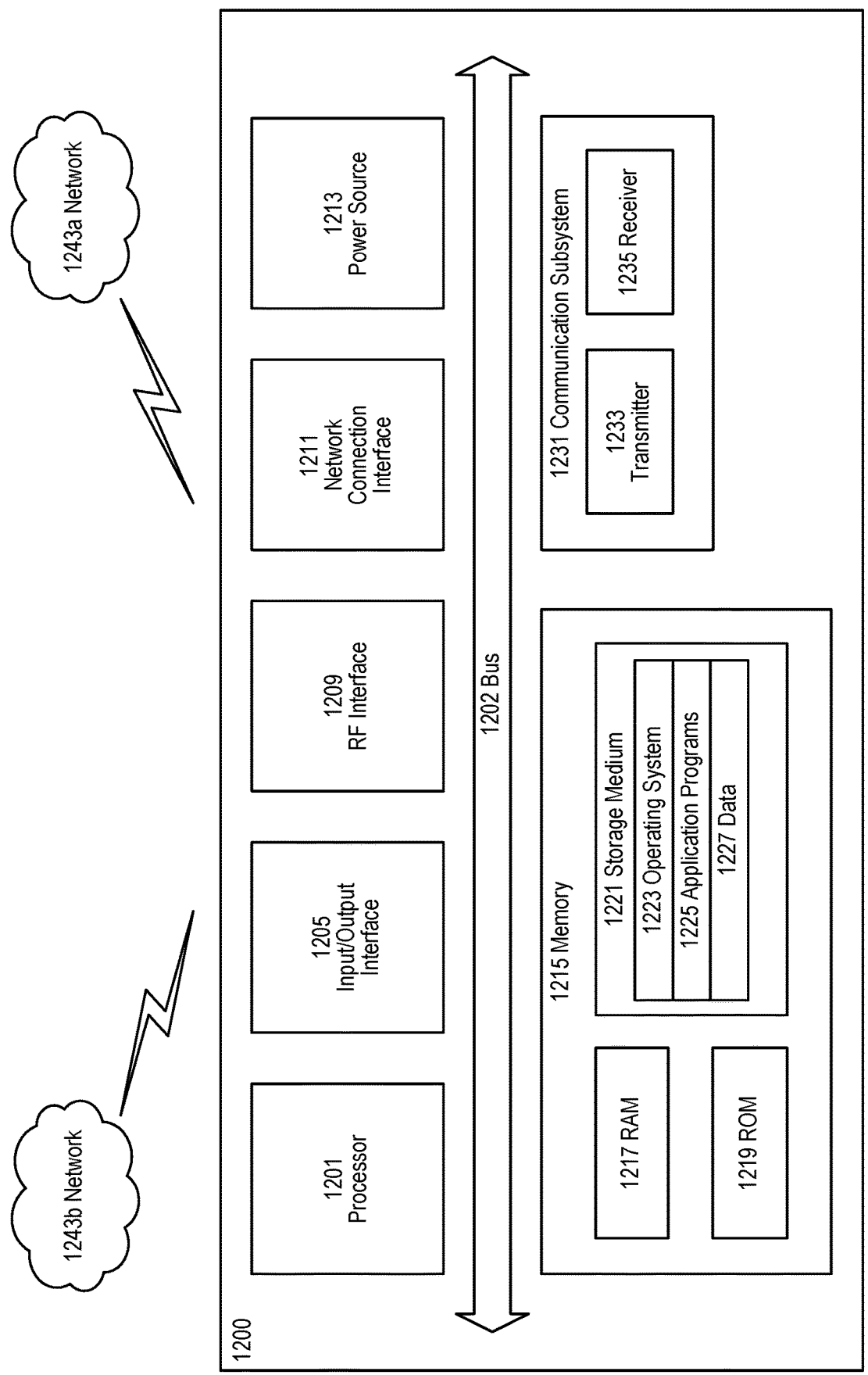
FIG. 11 is a schematic block diagram illustrating an example of a user equipment, according to particular embodiments of the present disclosure.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 11, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 12:
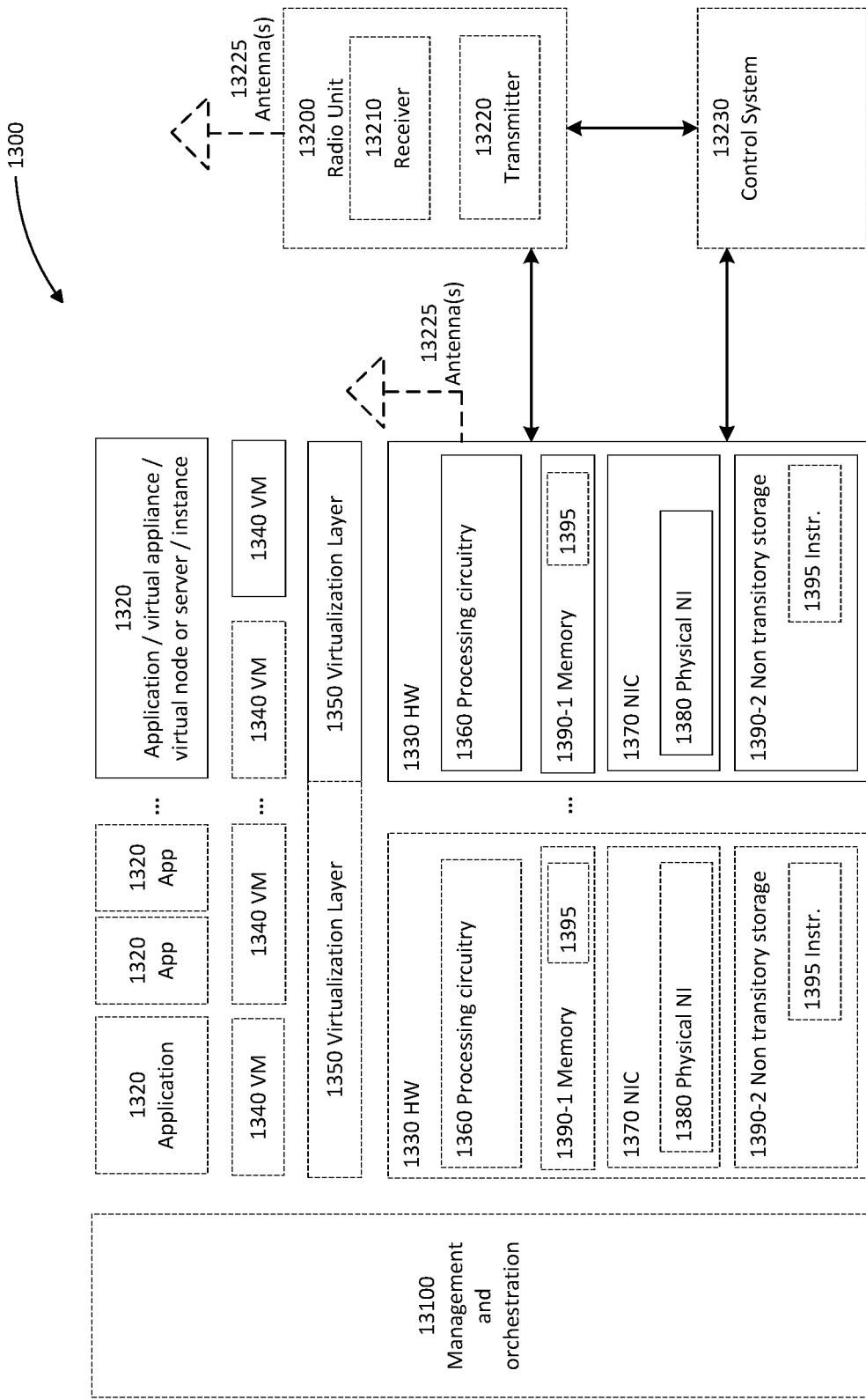
FIG. 12 is a schematic block diagram illustrating an example of a virtualization environment, according to particular embodiments of the present disclosure.

FIG. 12 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 12, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 12.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 13:
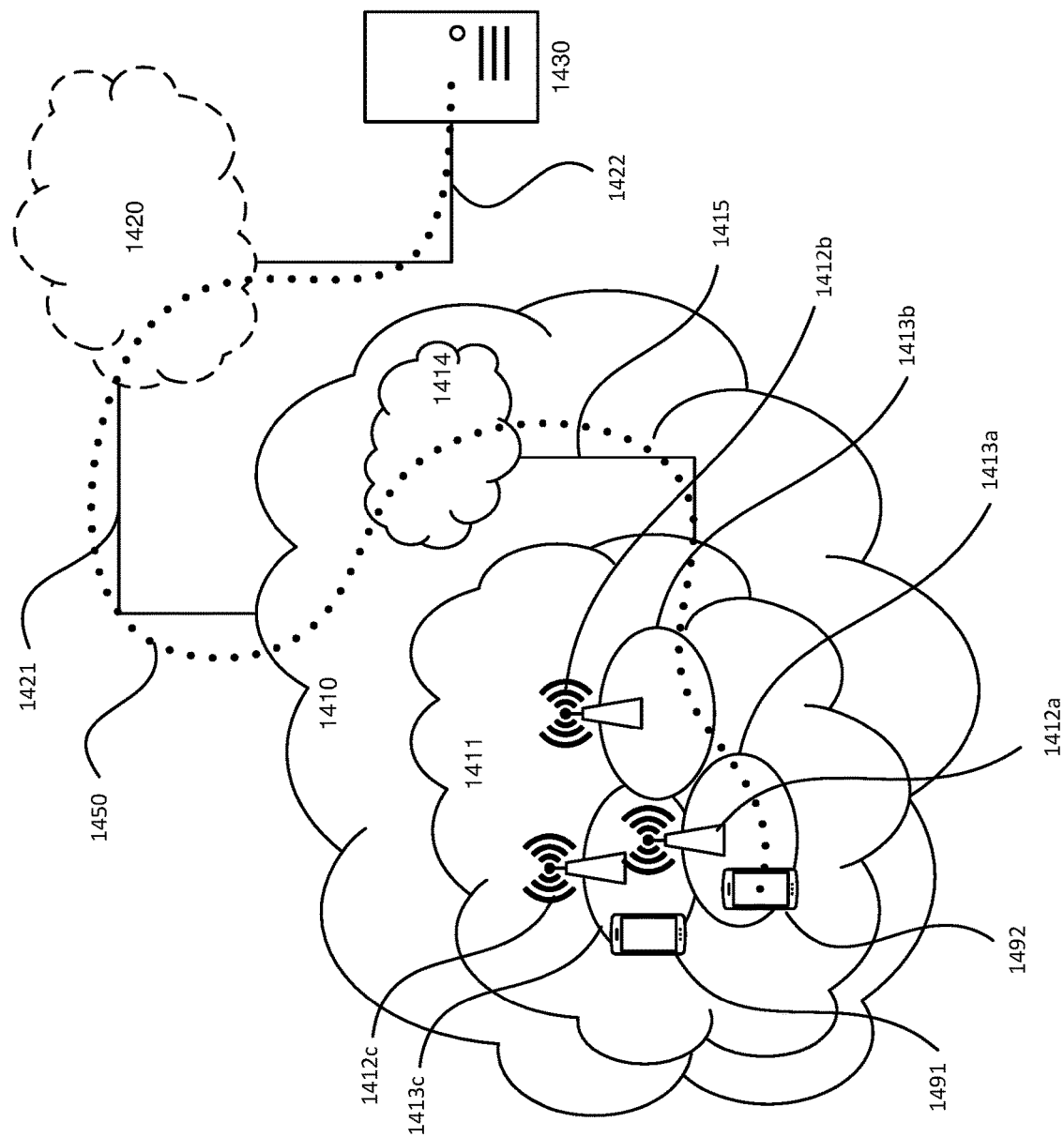
FIG. 13 is a schematic illustrating an example telecommunication network, according to particular embodiments of the present disclosure.

FIG. 13 illustrates a telecommunication network connected via an intermediate network to a host computer in accordance with some embodiments. In particular, with reference to FIG. 13, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 13 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 14:
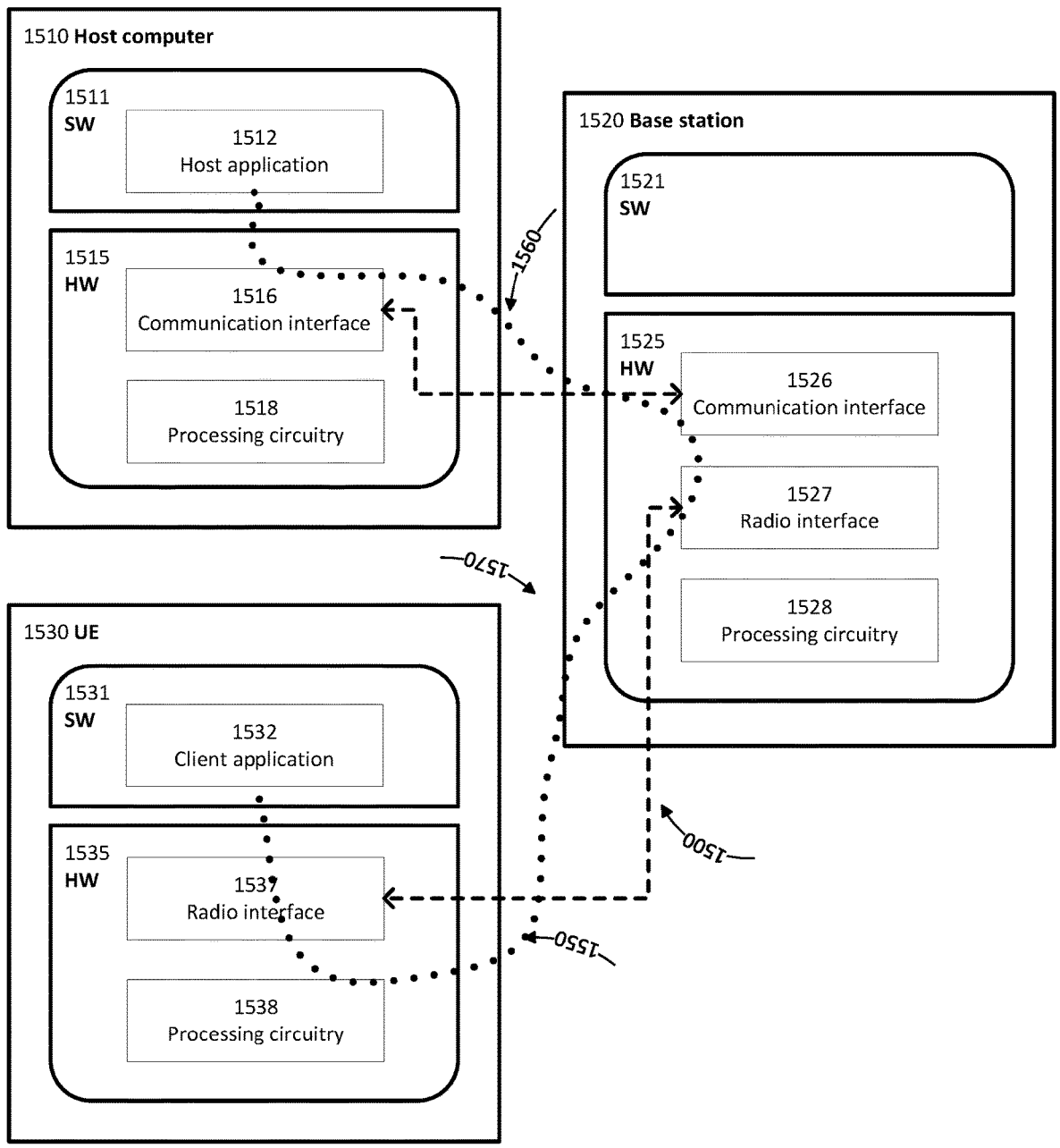
FIG. 14 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 14) served by base station 1520. Communication interface 1526 may be configured to facilitate connection 1560 to host computer 1510. Connection 1560 may be direct or it may pass through a core network (not shown in FIG. 14) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 14 may be similar or identical to host computer 1430, one of base stations 1412a, 1412b, 1412c and one of UEs 1491, 1492 of FIG. 13, respectively. This is to say, the inner workings of these entities may be as shown in FIG. 14 and independently, the surrounding network topology may be that of FIG. 13.

In FIG. 14, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve service continuity and thereby provide benefits such as the ability to handover between access nodes without a perceptible interruption in service.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 15:
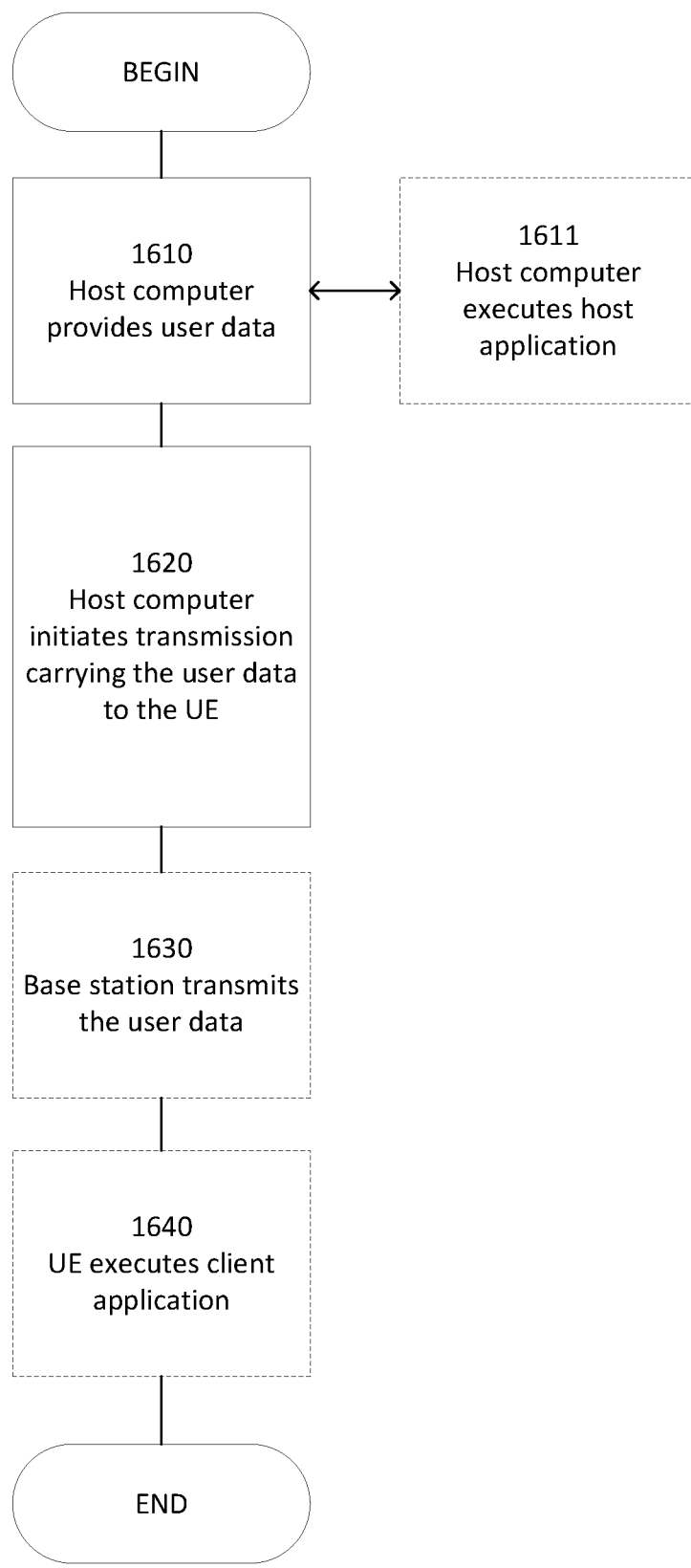
FIGS. 15-18 are a flow diagrams, each of which illustrates an example method implemented in a communication system, according to particular embodiments of the present disclosure.

FIG. 15 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 15 will be included in this section. In step 1610, the host computer provides user data. In substep 1611 (which may be optional)

of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 16:
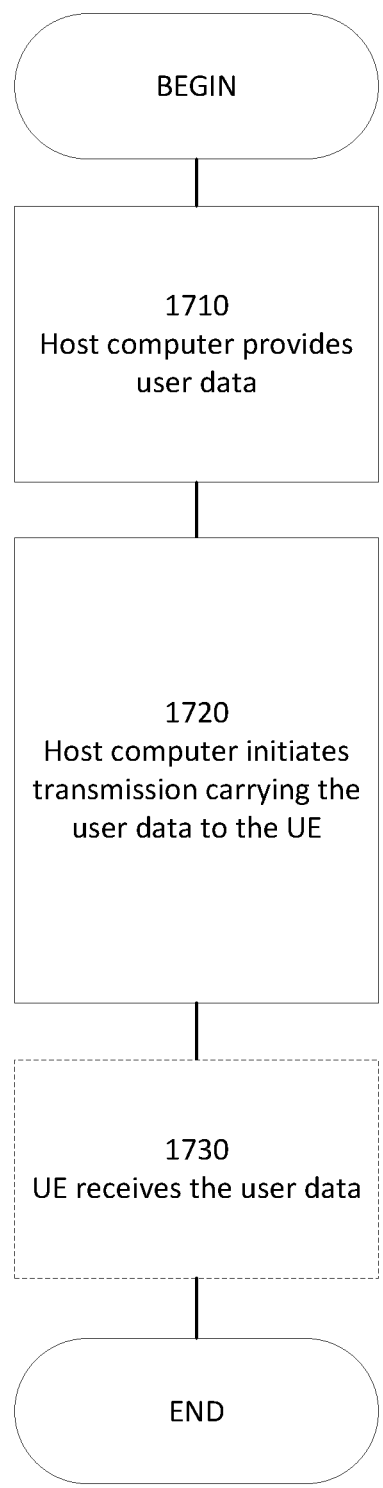

FIG. 16 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 16 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 17:
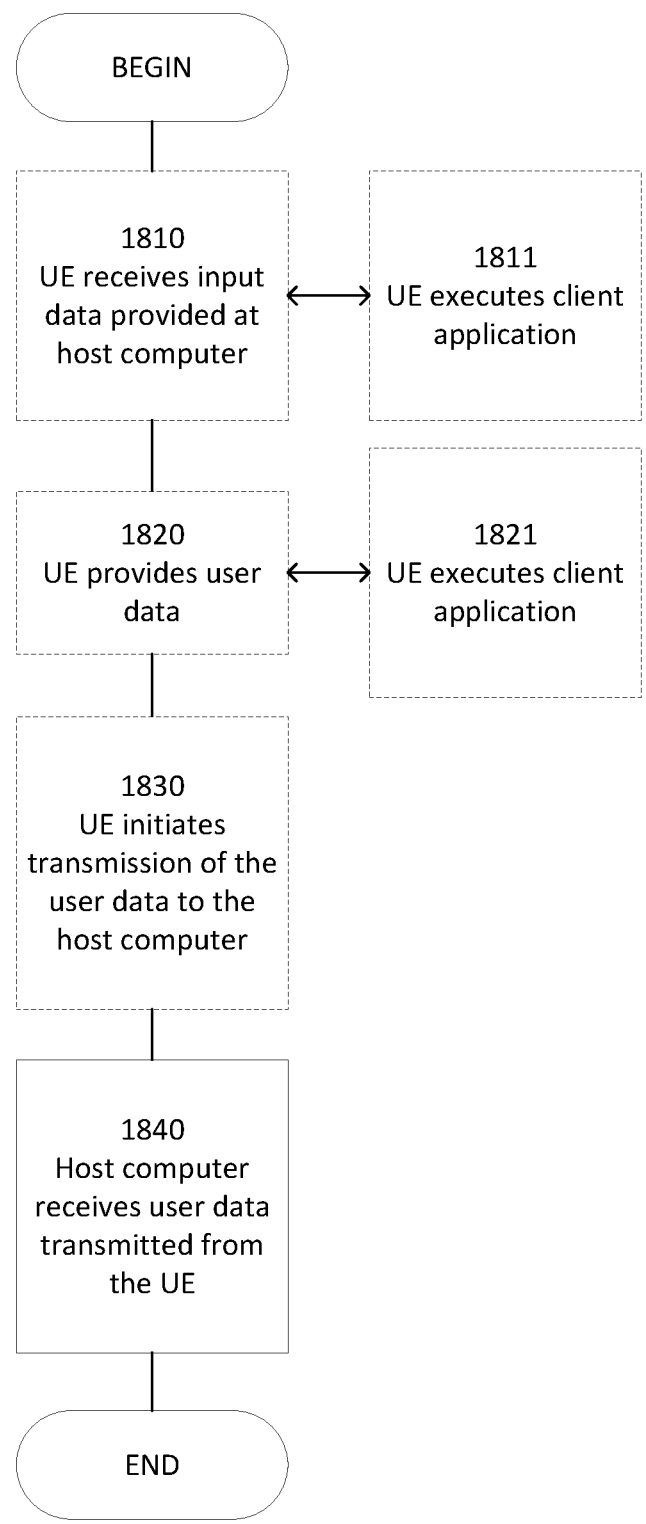

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 18:
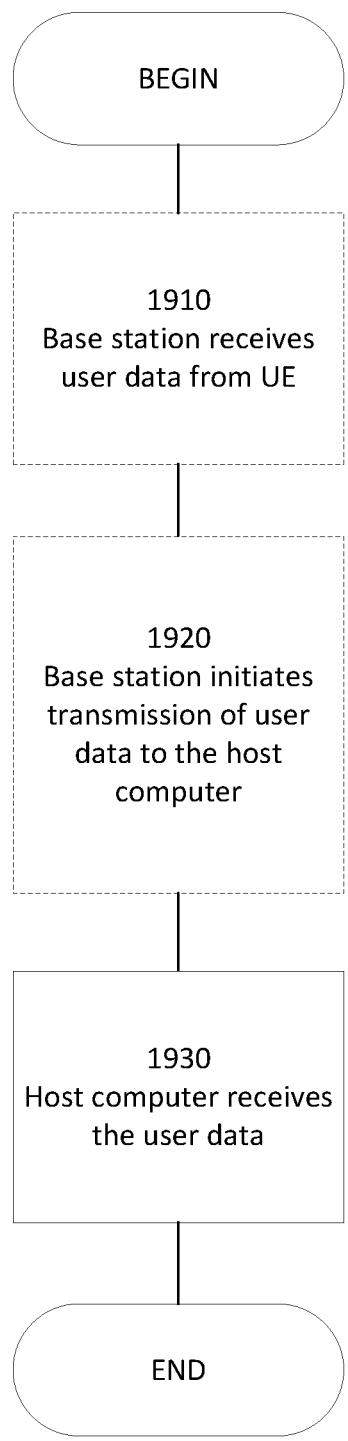

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended enumerated embodiments are intended to be embraced therein.

What is claimed is:
1. A method, implemented by a radio access network (RAN) node in a RAN of a wireless communication network, the method comprising:
  detecting an overload condition of the RAN;
  responsive to detecting the overload condition of the RAN, signaling a wireless device to stop reporting

Quality of Experience (QoE) measurements to the RAN; and notifying a management system outside of the wireless communication network that the reporting of QoE measurements to the RAN has stopped.

2. The method of claim 1, further comprising subsequent to notifying the management system that the reporting of QoE measurements to the RAN has stopped, signaling the wireless device to restart reporting of the QoE measurements, and notifying the management system that the reporting of QoE measurements has restarted.

3. The method of claim 2, wherein signaling the wireless device to restart reporting is responsive to detecting that the overload condition of the RAN has ended.

4. The method of claim 2, further comprising signaling the wireless device to modify how the wireless device performs the QoE measurements.

5. The method of claim 4, wherein signaling the wireless device to modify how the wireless device performs the QoE measurements is responsive to receiving a request from the management system to modify how the wireless device performs the QoE measurements.

6. The method of claim 5, wherein the request from the management system to modify how the wireless device performs the QoE measurements comprises at least one QoE measurement parameter for the wireless device to use for collecting subsequent QoE measurements.

7. The method of claim 4, wherein signaling the wireless device to modify how the wireless device performs the QoE measurements comprises signaling the wireless device to prolong a collection duration of the QoE measurements.

8. The method of claim 4, wherein signaling the wireless device to modify how the wireless device performs the QoE measurements comprises signaling the wireless device to increase a target area of the QoE measurements.

9. The method of claim 1, wherein notifying the management system that the reporting of QoE measurements has stopped comprises notifying the management system of a service type of the QoE measurements for which reporting has stopped.

10. The method of claim 1, further comprising forwarding the reporting of the QoE measurements from the wireless device to a measurement collection entity in a core network of the wireless communication network.

11. A radio access network (RAN) node in a RAN of a wireless communication network, the RAN node comprising:
a processor and a memory, the memory containing instructions executable by the processor whereby the RAN node is configured to:
detect an overload condition of the RAN;
responsive to detecting the overload condition of the RAN, signal a wireless device to stop reporting Quality of Experience (QoE) measurements to the RAN; and
notify a management system outside of the wireless communication network that the reporting of QoE measurements to the RAN has stopped.

12. The RAN node of claim 11, wherein the RAN node is further configured to, subsequent to notifying the management system that the reporting of QoE measurements to the RAN has stopped, signal the wireless device to restart reporting of the QoE measurements, and notify the management system that the reporting of QoE measurements has restarted.

13. The RAN node of claim 12, wherein the RAN node is further configured to signal the wireless device to restart the reporting responsive to detecting that the overload condition of the RAN has ended.

14. The RAN node of claim 12, wherein the RAN node is further configured to signal the wireless device to modify how the wireless device performs the QoE measurements.

15. The RAN node of claim 14, wherein the RAN node is further configured to signal the wireless device to modify how the wireless device performs the QoE measurements responsive to receiving a request from the management system to modify how the wireless device performs the QoE measurements.

16. The RAN node of claim 15, wherein the request from the management system to modify how the wireless device performs the QoE measurements comprises at least one QoE measurement parameter for the wireless device to use for collecting subsequent QoE measurements.

17. The RAN node of claim 14, wherein to signal the wireless device to modify how the wireless device performs the QoE measurements, the RAN node is configured to signal the wireless device to prolong a collection duration of the QoE measurements.

18. The RAN node of claim 14, wherein to signal the wireless device to modify how the wireless device performs the QoE measurements, the RAN node is configured to signal the wireless device to increase a target area of the QoE measurements.

19. The RAN node of claim 11, wherein to notify the management system that the reporting of QoE measurements has stopped, the RAN node is configured to notify the management system of a service type of the QoE measurements for which reporting has stopped.

20. A non-transitory computer readable medium storing a computer program product for controlling a programmable Radio Access Network (RAN) node in a RAN of a wireless communication network, the computer program product comprising software instructions that, when run on the programmable RAN node, cause the programmable RAN node to:
detect an overload condition of the RAN;
responsive to detecting the overload condition of the RAN, signal a wireless device to stop reporting Quality of Experience (QoE) measurements to the RAN; and
notify a management system outside of the wireless communication network that the reporting of QoE measurements to the RAN has stopped.

* * * * *

UNITED STATES PATENT AND TRADEMARK OFFICE
CERTIFICATE OF CORRECTION

Page 1 of 2

PATENT NO. : 12,041,490 B2
APPLICATION NO. : 17/284925
DATED : July 16, 2024
INVENTOR(S) : Johansson et al.

It is certified that error appears in the above-identified patent and that said Letters Patent is hereby corrected as shown below:

On the Title Page

Below "Item (65)" insert -- Related U.S. Application Data (60) Provisional application No. 62/754,117, filed on Nov. 1, 2018. --.

In the Drawings

In Fig. 7, Sheet 5 of 15, for Tag "410", in Line 4, delete "RESTARTED." and insert -- RESTARTED --, therefor.

In Fig. 10, Sheet 7 of 15, for Tag "1172", in Line 1, delete "Tranceiver" and insert -- Transceiver --, therefor.

In Fig. 10, Sheet 7 of 15, for Tag "1116", in Line 1, delete "Amplifier(S)" and insert -- Amplifier(s) --, therefor.

In Fig. 10, Sheet 7 of 15, for Tag "1118", in Line 1, delete "Filter(S)" and insert -- Filter(s) --, therefor.

In Fig. 10, Sheet 7 of 15, for Tag "1122", in Line 2, delete "Tranceiver" and insert -- Transceiver --, therefor.

In the Specification

In Column 2, Lines 58-60, delete "Mobility Management. . . . . . (MME)." and insert the same at Line 57, after "and" as a continuation paragraph.

In Column 4, Line 46, delete "schematic" and insert -- schematic block diagram --, therefor.

In Column 7, Line 3, delete "number" and insert -- number of --, therefor.

Signed and Sealed this
Fifth Day of November, 2024

Katherine Kelly Vidal
*Director of the United States Patent and Trademark Office*

CERTIFICATE OF CORRECTION (continued)
U.S. Pat. No. 12,041,490 B2

In Column 8, Line 10, delete "type" and insert -- type of --, therefor.

In Column 8, Line 26, delete "equipped" and insert -- equipment --, therefor.

In Column 13, Line 35, delete "units" and insert -- units. --, therefor.

In Column 14, Lines 48-49, delete "radio front end circuitry 1190" and insert -- radio front end circuitry 1192 --, therefor.

In Column 15, Line 64, delete "(CPE)." and insert -- (CPE), --, therefor.

In Column 16, Line 15, delete "etc.) personal" and insert -- etc.), personal --, therefor.

In Column 16, Line 51, delete "Radio front end circuitry 1114" and insert -- Radio front end circuitry 1112 --, therefor.

In Column 19, Line 37, delete "interchangeable." and insert -- interchangeably. --, therefor.

In Column 19, Line 46, delete "power source 1233," and insert -- power source 1213, --, therefor.

In Column 22, Line 50, delete "memory 1390. Memory 1390" and insert -- memory 1390-1. Memory 1390-1 --, therefor.

In Column 24, Line 65, delete "embodiments" and insert -- embodiments. --, therefor.

In Column 28, Line 16, delete "according" and insert -- according to --, therefor.